(12) United States Patent
Diggins (10) Patent No.: US 11,109,096 B2
(45) Date of Patent: Aug. 31, 2021

(54) DETERMINING A QUALITY MEASURE FOR A PROCESSED VIDEO SIGNAL

(71) Applicant: GRASS VALLEY LIMITED, Newbury (GB)

(72) Inventor: Jonathan Diggins, Lovedean (GB)

(73) Assignee: GRASS VALLEY LIMITED, Newbury (GB)

( * ) Notice: Subject to any disclaimer, the term of this patent is extended or adjusted under 35 U.S.C. 154(b) by 12 days.

(21) Appl. No.: 15/753,895

(22) PCT Filed: Aug. 25, 2016

(86) PCT No.: PCT/GB2016/052638
§ 371 (c)(1),
(2) Date: Feb. 20, 2018

(87) PCT Pub. No.: WO2017/033017
PCT Pub. Date: Mar. 2, 2017

(65) Prior Publication Data
US 2018/0270528 A1    Sep. 20, 2018

(30) Foreign Application Priority Data

Aug. 26, 2015  (GB) .................................... 1515142

(51) Int. Cl.
| H04N 7/12 | (2006.01) |
| H04N 21/44 | (2011.01) |
| H04N 17/00 | (2006.01) |
| G06F 17/18 | (2006.01) |
| H04N 5/91 | (2006.01) |
| H04N 21/647 | (2011.01) |
| H04N 5/913 | (2006.01) |

(52) U.S. Cl.
CPC ....... *H04N 21/44008* (2013.01); *G06F 17/18* (2013.01); *H04N 5/91* (2013.01); *H04N 17/00* (2013.01); *H04N 21/647* (2013.01); *H04N 2005/91335* (2013.01)

(58) Field of Classification Search
CPC .. H04N 21/44008; H04N 21/647; H04N 5/91; H04N 17/00; H04N 2005/91335; G06F 17/18
See application file for complete search history.

(56) References Cited

U.S. PATENT DOCUMENTS

| 2015/0103250 A1* | 4/2015 | Watanabe ............... G06T 5/007 348/576 |
| 2016/0021376 A1* | 1/2016 | Andreopoulos ..... H04N 17/004 348/181 |

OTHER PUBLICATIONS

S. Chikkerur, V. Sundaram. "Objective Video Quality Assessment Methods: A Classification, Review, and Performance Comparison," in IEEE Transaction on Broadcasting, vol. 57, No. 2, pp. 165-182, Jun. 2011 (Year: 2011).*

(Continued)

*Primary Examiner* — Richard T Torrente
(74) *Attorney, Agent, or Firm* — Arent Fox LLP (57) ABSTRACT

A method of determining a quality measure for a processed video signal generated from an original video signal. A statistical metric for a value for a set of pixels of the original video signal is determined, and the statistical metric for the value for a corresponding set of pixels of the processed video signal is also determined. The quality measure for the processed video signal is then determined by comparing the statistical metrics for the original video signal and the processed video signal.

21 Claims, 4 Drawing Sheets

(56) References Cited

OTHER PUBLICATIONS

Pinson et al, "A New Standardized Method for Objectively Measuring Video Quality", IEEE Transactions on Broadcasting, (2004), vol. 50, No. 3, pp. 312-322.

* cited by examiner

DETERMINING A QUALITY MEASURE FOR A PROCESSED VIDEO SIGNAL

CROSS-REFERENCE TO RELATED APPLICATIONS

This application is a U.S. national phase filing under 35 U.S.C. § 371 of PCT/GB2016/052638 filed on Aug. 25, 2016 which claims priority from Great Britain Patent Application No. GB 1515142.6 filed on Aug. 26, 2015, which applications are hereby incorporated by reference in their entirety.

FIELD OF THE INVENTION

The present invention concerns determining a quality measure for a processed video signal. More particularly, but not exclusively, the invention concerns determining a quality measure for a processed video signal in comparison to the original video signal from which it was generated. The invention is particularly applicable to approximating the peak signal-to-noise ratio of a processed video signal.

BACKGROUND OF THE INVENTION

It is common for video signals to undergo processing. Such processing may be done, for example, to provide video signals of different qualities for use different where different bandwidths are available. When this is done, it is often desirable to determine a measure of the quality of a processed video signal compared to the original video signal.

A well-established quality measure is the peak signal-to-noise ratio (PSNR). The PSNR is calculated by comparing a particular value for pixels in the processed video signal with the value for the corresponding pixels in the original video signal. Typically, the compared value is the image luminance of the pixels.

In particular, the PSNR provides a logarithmic measure of the root-mean-square difference between the processed video signal and the original video signal, and for suitable video signals may be defined as:

$$PSNR = 10\log_{10}\left(\frac{255^2}{\frac{1}{XY}\sum_{x=0}^{X-1}\sum_{y=0}^{Y-1}(P_{x,y}^A - P_{x,y}^B)^2}\right)$$

where $P_{x,y}^A$ is the luminance of the pixel at position x, y for processed video signal A, and similarly for the original video signal B.

However, it is a disadvantage of the PSNR as a quality measure that its calculation requires access to the values for all the pixels of the processed video signal and original video signal, meaning that it has a large bandwidth overhead.

The present invention seeks to mitigate the above-mentioned problems. Alternatively or additionally, the present invention seeks to provide improved methods and systems for determining a quality measure for a processed video signal.

SUMMARY OF THE INVENTION

In accordance with a first aspect of the invention there is provided a method of determining a quality measure for a processed video signal generated from an original video signal, the method comprising the steps of:

determining a statistical metric for a value for a set of pixels of the original video signal;

determining the statistical metric for the value for a corresponding set of pixels of the processed video signal; and determining the quality measure for the processed video signal by comparing the statistical metrics for the original video signal and the processed video signal.

As discussed above, conventionally the PSNR for a processed video signal is calculated by comparing a value such as the luminance for pixels of the processed video signal with the value for the corresponding pixels of the original video signal. The PSNR is calculated using the expectation value $\langle e^2 \rangle$ of the squared error between the values:

$$\langle e^2 \rangle = \frac{1}{XY}\sum_{x=0}^{X-1}\sum_{y=0}^{Y-1}(P_{x,y}^A - P_{x,y}^B)^2$$

However, an alternative way of expressing the squared error $\langle e^2 \rangle$ is in terms of a joint probability, by integrating every pixel difference with the joint probability p of that difference:

$$\langle e^2 \rangle = \sum_{n=0}^{255}\sum_{m=0}^{255}(n-m)^2 p(n,m)$$

By making the assumption that the values for the processed video signal are likely to be within a close range to the values for the original video signal, and that the variation of the values over such a range is uniform, it can be determined that $\langle e^2 \rangle$ will (to a good approximation) be proportional to the difference between the standard deviation of the values for the processed video signal and original video signal. Further, it has been confirmed by experimentation that this is indeed the case. Further, other statistical metrics can be used instead of the standard deviation.

As the standard deviation is a single scalar value for each of the processed video signal and the original video signal, the bandwidth overhead required determine a quality measure using the standard deviations of the values for the processed video signal and original video signal is very low. This allows the quality measure to be determined using a low amount of processing power and memory space.

Preferably, the quality measure approximates the peak signal-to-noise ratio of the processed video signal. Calculating the PSNR in this way has a much lower bandwidth overhead than conventional methods. For example for a High Definition (HD) video signal it has been determined that a 115200:1 reduction in bandwidth could potentially be achieved.

Preferably, the statistical metric for the value for the set of pixels is indicative of the statistical deviation of the value for the set of pixels. More preferably, the statistical metric for the value for the set of pixels is the standard deviation of the value for the set of pixels. Less preferably, the statistical metric may be the average deviation, for example.

Preferably, the value for a pixel is the luminance of the pixel. However, it will be appreciated that many other values could be used, for example the Red, Green and/or Blue values for a pixel, colour difference values $C_b$ or $C_r$, or any other suitable value.

Advantageously, the quality measure is determined using a predetermined function that relates the statistical metrics to peak signal-to-noise ratio values. The predetermined function may represent a curve-fit model, and is preferably a non-linear best-fit function, such as a logarithmic function. Less preferably, the predetermined function is a linear best-fit function. The best-fit function may be determined by, for a set of processed video signals, calculating the differences in the statistical metrics, and also calculating the PSNR by a conventional method, and then using any of various well-known statistical methods for determining a best-fit function.

Advantageously, the method further comprises the steps of:

determining a measure indicative of the number of distinct values in the set of pixels of the original video signal and/or the processed video signal; and modifying the quality measure for the processed video signal using the determined measure for the original video signal and/or the processed video signal. Preferably, the measure is the entropy of the value for the set of pixels of the original video signal and/or the processed video signal. It has been found that approximating the PSNR using the difference in standard deviations tends to overestimate the PSNR where the entropy of the video signal is low. To overcome this, the determined quality measure can be reduced when the entropy of the original video signal and/or the processed video signal is low. In contrast, at normal or high entropy levels little or no reduction to the determined quality measure is made.

Advantageously, the method further comprises the steps of:

determining the level of clipping of the value for the set of pixels of the original video signal;

determining the level of clipping of the value for the corresponding set of pixels of the processed video signal; and modifying the quality measure for the processed video signal using the difference between the levels of clipping for the original video signal and the processed video signal. According to agreed standards, values such as the luminance of pixels should only be within a certain range. However, the original video signal may include values outside that range, for example due to method by which the original video signal is generated. During generation of the processed video signal, values falling outside the range at one or both ends may be "clipped" so that they fall within the range. (In other words, values below the bottom end of the range will be "clipped" to be at the bottom end of the range, and similarly values above the top end of the range will be "clipped" to be at the top end of the range.) As clipping of the video signal will adversely affect the determination of quality measure, in particular because the underlying assumption that the variation of the value between the video signals is uniform is broken, the effects of this can be mitigated by determining when clipping has occurred and modifying the quality measure accordingly.

Preferably, the set of pixels corresponds to a region of an image of the original video signal and processed video signal. The set of pixels may correspond to a frame of the video signal, or, in the case that the video signal is interlaced, a field of the video signal. Advantageously, however, the standard deviation is determined for a plurality of regions of the original video signal and processed video signal, and the quality measure is determined by comparing the standard deviations for the original video signal and the processed video signal for each region. It has been found that determining the difference in standard deviations for a plurality of regions and then combining the results leads to a more reliable determination of the quality measure.

Preferably, an average quality measure is determined from the average of the quality measures for a predetermined time period. This provides a significantly more reliable quality measure. The predetermined time period may result in an average of 16 frames (or fields in the case of an interlaced video signal), for example. The average is preferably the mean, but another average such as the median may be used.

Advantageously, the method further comprises the step of adding the determined statistical metric to fingerprint data for the original video signal and/or processed video signal. In this way, the statistical metric can be obtained from the fingerprint data, and does not need to be recalculated, when a video signal is used in the determination of multiple quality measures. Similarly, the determined entropy, clip value and/or other determined values may be added to the fingerprint data. As the amount data to be added is small, this does not have a disadvantageous effect on the bandwidth or storage required by the fingerprint data.

In accordance with a second aspect of the invention there is provided a video signal fingerprint generator for use in any of the methods described above, arranged to:

receive an input video signal;

determine a statistical metric for a value for a set of pixels of the video signal; and output fingerprint data for the input video signal;

wherein the fingerprint data includes the determined statistical metric for the input video signal.

Similarly, the fingerprint data may include the determined entropy, clip value and/or other determined values.

In accordance with a third aspect of the invention there is provided a video signal quality measure determiner for use in any of the methods described above, arranged to:

receive a statistical metric of a value for a set of pixels of an original video signal;

receive a statistical metric of the value for a corresponding set of pixels of a processed video signal; and determine the quality measure for the processed video signal by comparing the statistical metrics for the original video signal and the processed video signal.

In accordance with a fourth aspect of the invention there is provided a system for determining a quality measure for a processed video signal generated from an original video signal, comprising:

a first video signal fingerprint generator as described above, arranged to receive the original video signal as input video signal;

a second video signal fingerprint generator as described above, arranged to receive the processed video signal as input video signal; and a video signal quality measure determiner as described above, arranged to receive the fingerprint data output by the first and second video signal fingerprint generators.

In accordance with a fourth aspect of the invention there is provided a computer program product for determining a quality measure for a processed video signal generated from an original video signal, arranged when executed on a computer system to perform any of the methods described above.

In accordance with a fifth aspect of the invention there is provided a computer program product for use in determining a quality measure for a processed video signal generated from an original video signal, arranged when executed on a computer system to provide the video signal fingerprint generator described above.

In accordance with a sixth aspect of the invention there is provided a computer program product for determining a quality measure for a processed video signal generated from an original video signal, arranged when executed on a computer system to provide the video signal quality measure determiner described above.

In accordance with a seventh aspect of the invention there is provided a computer program product for determining a quality measure for a processed video signal generated from an original video signal, arranged when executed on a computer system to provide the computer system described above.

It will of course be appreciated that features described in relation to one aspect of the present invention may be incorporated into other aspects of the present invention. For example, the method of the invention may incorporate any of the features described with reference to the apparatus of the invention and vice versa.

DESCRIPTION OF THE DRAWINGS

Embodiments of the present invention will now be described by way of example only with reference to the accompanying schematic drawings of which.

DETAILED DESCRIPTION

An embodiment of the invention is now described, with reference to FIGS. 1 to 4.

Figure 1:
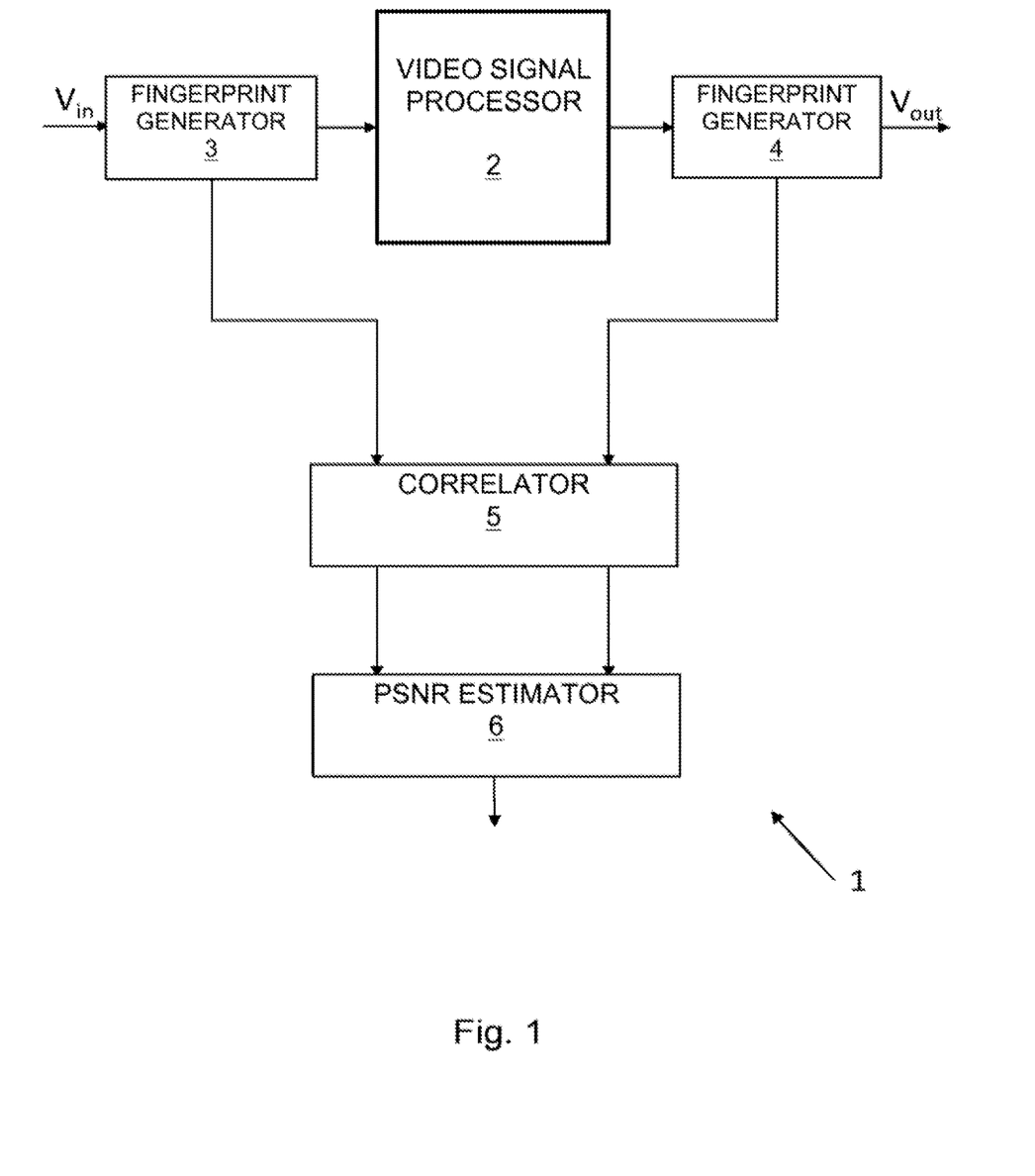
FIG. 1 shows a video processing system in accordance with a first embodiment of the invention.

FIG. 1 shows a video processing system 1 in which the embodiment of the invention is implemented. The video processing system may be a part of a system for producing the video content for a television station, for example. The video processing system 1 takes an original video signal $V_{in}$, which is processed by a video signal processor 2, to produce a processed video signal $V_{out}$. It will be appreciated that the video signal processor 2 may in practice comprise multiple processing systems that each perform one or more processing operations on the original video signal as it passes through the video processing system 1.

The video processing system 1 further comprises a first video signal fingerprint generator 3, which receives the original video signal $V_{in}$ before it is passed to the video signal processor 2, and a second video signal fingerprint generator 4, which receives the processed video signal $V_{out}$ after it has been processed by the video signal processor 2.

As discussed in more detail below, each of the first video signal fingerprint generator 3 and second video signal fingerprint generator 4 generates a stream of low bandwidth fingerprint data from its respective video signal, and passes that fingerprint data to a correlator 5. Again as discussed in more detail below, the correlator 5 analyses the two streams of fingerprint data, and then passes them to a PSNR estimator 6, which determines an estimation of the PSNR of the video signals.

Figure 2:
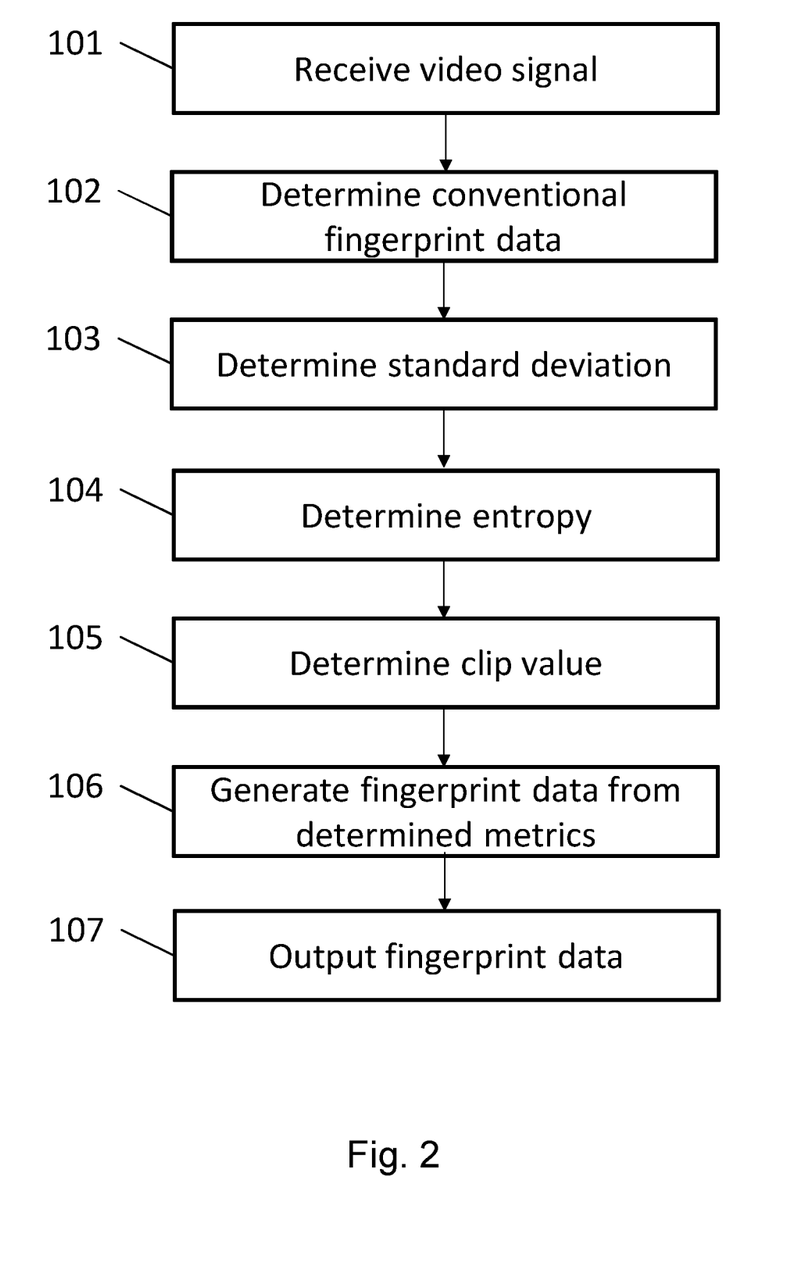
FIG. 2 is a flowchart showing the operation of the video signal fingerprint generators of FIG. 1.

The operation of the first and second video signal fingerprint generators 3 and 4 of FIG. 1 is now described in more detail with reference to the flowchart of FIG. 2. Each of the video signal fingerprint generators operates in an identical fashion.

First, the video signal fingerprint generator receives an input video signal (step 101). The fingerprint generator determines conventional fingerprint data from the input video signal (step 102), for example as described in WO 2009/104022 A2 published 27 Aug. 2009. The conventional fingerprint data is used by the correlator 5 as described below.

Figure 3:
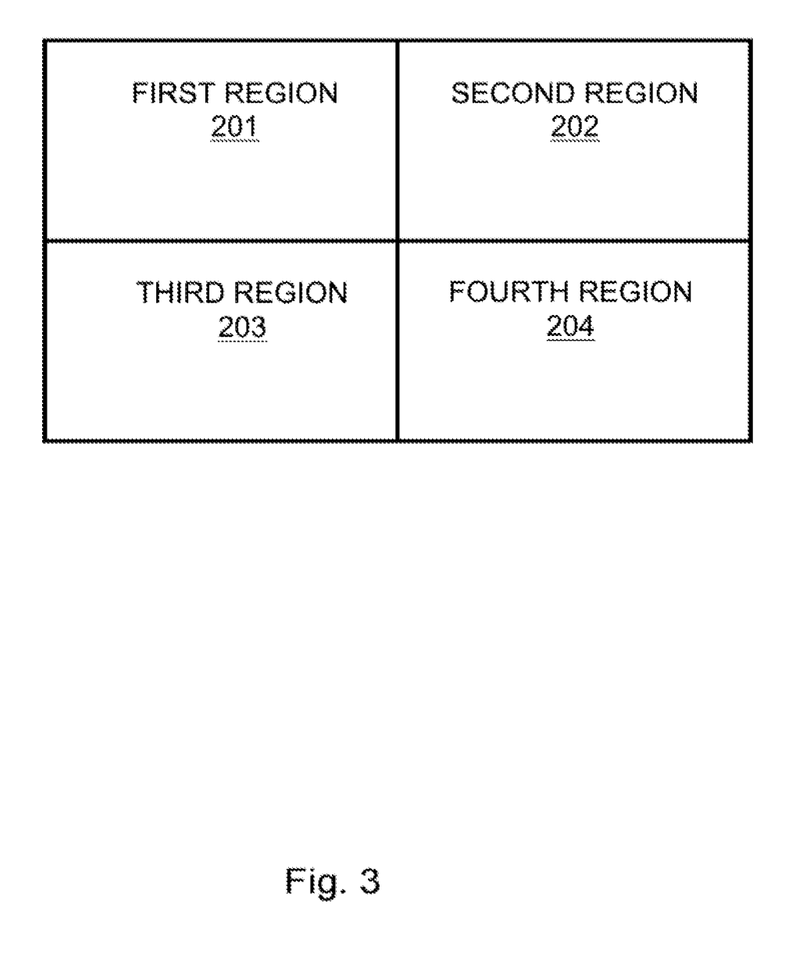
FIG. 3 is an image from a video signal split into a plurality of regions.

The fingerprint generator then determines the standard deviation of the luminance of the pixels of the input video signal (step 103). In fact, the standard deviation is determined separately for a plurality of regions of an image of the input video signal, as shown in FIG. 3. As can be seen, the a frame of the input video signal (or in the case of an interlaced signal, a field of the input video signal) is divided into four regions 201, 202, 203 and 204. In other embodiments, the frame may be divided into different regions, which may be different in number and/or shape. In still other embodiments, pixels from a plurality of frames are used to determine the standard deviation.

The square of the standard deviation of each region is calculated from the variance of each region, expressed as a first accumulator that accumulates the squares of the pixel luminance values, and the square of a second accumulator that accumulates the pixel values themselves:

$$\sigma^2 = \left(\frac{1}{N}\sum_{n=0}^{N-1} Y_n \times Y_n\right) - \left(\frac{1}{N}\sum_{n=1}^{N-1} Y_n\right)^2$$

(The advantage of using this approach is that it allows the result to be obtained using only one pass of the data.)

The standard deviation is then the square root of the calculated square of the standard deviation:

$$\sigma = \sqrt{\sigma^2}$$

Next, the fingerprint generator determines the entropy for each region (step 104). The entropy is calculated from a histogram of luminance values for the region, where the histogram for each region has 256 "bins" $b_0$ to $b_{255}$, as:

$$e = \log_2(C) - \frac{1}{C}\sum_{n=0}^{255} b_n \log_2(b_n)$$

where C is the number of pixels in the region and $b_n$ is the bin occupancy for bin $b_n$. (256 bins are used in the case that the data has 8 bits; it will be appreciated that a different number of bins could be used, particularly in the case that the data has a different number of bits.)

The fingerprint generator then determines the clip values for each region (step 105). The clip values for each region can be determined from the same histogram used to determine the entropy, as:

$$Y^{lo} = \sum_{n=0}^{Y^{lo}} b_n \approx \frac{C}{64}$$

$$Y^{hi} = \sum_{n=Y^{hi}}^{255} b_n \approx \frac{C}{64}$$

where $Y^{lo}$ and $Y^{hi}$ are the lower and upper bounds of the allowed luminance values, and the $\approx$ sign indicates the first bin encountered in each case for which the bin occupancy is greater than C/64. (It will be appreciated that a number other than 64 could be used.)

Once the various values for the input video signal have been determined, they are combined to generate fingerprint data for the video signal (step 106), which is then output (step 107).

The determined fingerprint data is provided so that it is available when required for determining quality measures using the video signals. It will be appreciated that in other embodiments the fingerprint data may already be available having been generated elsewhere, and so can the existing fingerprint data rather than needing to be calculated from the pixels of the video signal itself.

In either case, the fingerprint data for the original video signal and the processed video signal is passed to the correlator 5. The correlator 5 uses the conventional fingerprint data to identify corresponding frames of the original video signal and processed video signal, using any appropriate technique, so that errors do not occur due to one of the video signals being delayed with respect to the other, with the result that the standard deviations and other values for different frames are compared.

The correlator 5 then passes the other determined fingerprint data for the original video signal and processed video signal, i.e. the standard deviation, entropy and clip values, to the PSNR estimator 6, so that the PSNR estimator 6 receives the fingerprint data for corresponding frames of the video signals.

The PSNR estimator 6 then uses this data to estimate the PSNR for the processed video signal, as follows. The standard deviation difference (plus corrections) $\Delta s$ for the processed video signal A and original video signal B is:

$$\Delta s = \frac{1}{R} \sum_{i=1}^{R-1} |S_i^A - S_i^B + \Delta C_i^{lo(A,B)} + \Delta C_i^{hi(A,B)}| \times$$

$$\left( \alpha + \frac{(1-\alpha)}{2}(1 + \tanh((E_i^A + E_i^B - q) \times s)) \right)$$

for regions R of the video signals. The standard deviations $S_i$ for the two video signals are used to determine their difference, and differences in the standard deviations due to clipping are compensated for by the terms $\Delta C_i^{lo(A,B)}$ and $\Delta C_i^{hi(A,B)}$, which give a measure of the difference in the clipping of the values in the regions, and are calculated as:

$$\Delta C_i^{lo(A,B)} = Y_i^{lo(A)} - Y_i^{lo(B)}$$

$$\Delta C_i^{hi(A,B)} = Y_i^{hi(A)} - Y_i^{hi(B)}$$

for low clip value $Y_i^{lo}$ and high clip value $Y_i^{hi}$. The entropies $E_i$ are used to compensate for overestimating at low entropies, where $\alpha$, q and s are parameters determined to be appropriate to give a good result. Example values for the case where the luminance values are 8-bit are 0.2, 6 and 0.5 respectively. The hyperbolic tangent function tank then provides a "soft switch" which is 0.0 when the entropies are 0.0 and 1.0 when they are 8.0, and switches between the values 0.0 and 1.0 at the value q.

Figure 4:
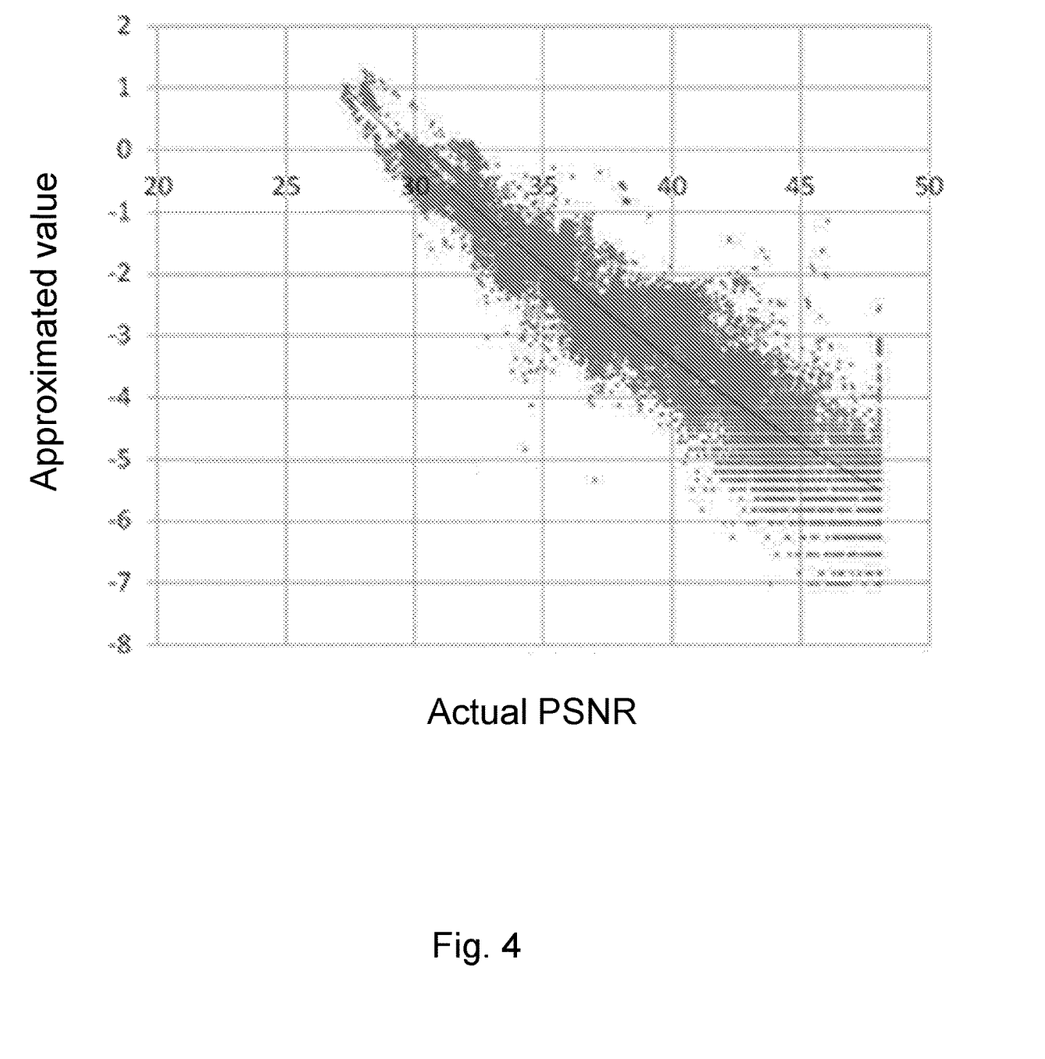
FIG. 4 is a graph plotting approximated values against actual PSNR values for a test set of video signals.

The standard deviation difference $\Delta s$ is then used to give a value y:

$$y = \begin{cases} \log_{10}(\Delta s) & \text{if } \Delta s > 0 \\ 0 & \text{otherwise} \end{cases}$$

and this is passed as an argument to an exponential function as follows:

$$P(t) = \exp\left(\frac{(A_m y + A_c) - 4y}{B_m y + B_c}\right)$$

where the parameter t indicates that the value is for a particular time t. $A_m$, $A_c$, $B_m$ and $B_c$ are appropriate parameters determined from a set of test video signals using standard statistical methods, by determining $\Delta s$ for each of the test video signals and comparing it to the actual PSNR values for each video signal as calculated by a conventional method. A graph plotting approximated values against actual PSNR values for a test set of video signals is shown in FIG. 4. Example values for the parameters are −14, 40.287, −3.9497 and 11.7182 respectively.

The PSNR at a time t can then be approximated by averaging the values for the surrounding 16 frames, as follows:

$$PSNR \approx \frac{1}{16} \sum_{k=-8}^{7} Clip[P(t+k), 0, 48]$$

where the function Clip ensures the values being averaged are within an appropriate range of values (i.e. between 0 and 48 inclusive).

While the present invention has been described and illustrated with reference to particular embodiments, it will be appreciated by those of ordinary skill in the art that the invention lends itself to many different variations not specifically illustrated herein.

The invention claimed is:

1. A method of determining a quality measure for a processed video signal generated from an original video signal, the method comprising:
   determining a statistical metric for a value for a set of pixels of the original video signal;
   determining the statistical metric for the value for a corresponding set of pixels of the processed video signal;
   comparing the statistical metric for the original video signal with the statistical metric for the processed video signal to determine a quality measure for the processed video signal that approximates a peak signal-to-noise ratio of the processed video signal;
   determining a level of clipping for the set of pixels of the original video signal having a luminance value that falls outside a clipping value range;
   determining a level of clipping for the corresponding set of pixels of the processed video signal having a luminance value that falls outside the clipping value range;

calculating a difference between the determined level of clipping between the original video signal and the determined level of clipping between the processed video signal; and modifying the quality measure for the processed video signal using the calculated difference between the respective levels of clipping for the original video signal and the processed video signal.

2. A method as claimed in claim 1, wherein the statistical metric for the value for the set of pixels of the original video signal and the processed video signal is a standard deviation of the value for the respective set of pixels.

3. A method as claimed in claim 1, wherein the value for a pixel is the luminance of the pixel.

4. A method as claimed in claim 3, further comprising determining the quality measure using a predetermined function that relates the statistical metrics to values for the peak signal-to-noise ratio.

5. A method as claimed in claim 1, further comprising modifying the quality measure for the processed video signal using a measure indicative of a number of distinct values in the set of pixels of the original video signal and/or the processed video signal.

6. A method as claimed in claim 5, wherein the measure is an entropy of the value for the set of pixels of the original video signal and/or the processed video signal.

7. A method as claimed in claim 1, wherein the set of pixels corresponds to a region of an image of the original video signal and processed video signal.

8. A method as claimed in claim 7, further comprising:
determining the quality measure for a plurality of regions of the original video signal and the processed video signal, and
determining the quality measure by comparing the statistical metrics for the original video signal and the processed video signal for each region.

9. A method as claimed in claim 1, further comprising determining an average quality measure from an average of the quality measures for a predetermined time period.

10. A method as claimed in claim 1, further comprising adding the determined statistical metric to fingerprint data for the original video signal and/or processed video signal.

11. A video signal fingerprint generator for use in a method as claimed in claim 1, configured to:
receive an input video signal;
determine a statistical metric for a value for a set of pixels of the video signal; and
output fingerprint data for the input video signal;
wherein the fingerprint data includes the determined statistical metric for the input video signal.

12. A video signal quality measure determiner for use in a method as claimed in claim 1, configured to:
receive a statistical metric for a value for a set of pixels of an original video signal;
receive the statistical metric for the value for a corresponding set of pixels of a processed video signal; and
determine the quality measure for the processed video signal by comparing the statistical metrics for the original video signal and the processed video signal.

13. A method as claimed in claim 1, wherein the determining of the level of clipping for the set of pixels of the original and the processed video signals comprises determining a portion of the respective sets of pixels having the luminance value that falls outside the clipping value range.

14. A system for determining a quality measure for a processed video signal generated from an original video signal, comprising:

a first video signal fingerprint generator configured to receive the original video signal as an input video signal and output fingerprint data for the input video signal that includes a statistical metric for a value for a set of pixels of the original video signal and a level of clipping for the set of pixels of the original video signal that have a luminance value that falls outside a clipping value range;

a second video signal fingerprint generator configured to receive the processed video signal as an input video signal and output fingerprint data for the input video signal that includes a statistical metric for a value for a set of pixels of the processed video signal and a level of clipping for the set of pixels of the processed video signal that have a luminance value that falls outside a clipping value range; and a video signal quality measure determiner configured to:
receive the fingerprint data output by the first and second video signal fingerprint generators;
receive the statistical metric for the value for the set of pixels of the original video signal;
receive the statistical metric for the value for the corresponding set of pixels of the processed video signal;
compare the statistical metric for the original video signal with the statistical metric for the processed video signal to determine a quality measure for the processed video signal that approximates a peak signal-to-noise ratio of the processed video signal;
obtain, from the fingerprint data received from the first video signal fingerprint generator, the level of clipping for the set of pixels of the original video signal having the luminance value that falls outside a clipping value range;
obtain, from the fingerprint data received from the second video signal fingerprint generator, the level of clipping for the corresponding set of pixels of the processed video signal having the luminance value that falls outside the clipping value range;
calculate a difference between the determined level of clipping of the original video signal and the determined level of clipping of the processed video signal, and
modify the quality measure for the processed video signal using the calculated difference between the respective levels of clipping for the original video signal and the processed video signal.

15. The system as claimed in claim 14, wherein the statistical metric for the value for the set of pixels of the original video signal and the processed video signal is a standard deviation of the value for the respective set of pixels.

16. The system as claimed in claim 14, wherein the value for a pixel is the luminance of the pixel.

17. The system as claimed in claim 16, wherein the video signal quality measure determiner is further configured to determine the quality measure using a predetermined function that relates the statistical metrics to values for the peak signal-to-noise ratio.

18. The system as claimed in claim 14, wherein the video signal quality measure determiner is further configured to modify the quality measure for the processed video signal using a received measure indicative of a number of distinct values in the set of pixels of the original video signal and/or the processed video signal.

19. The system as claimed in claim 18, wherein the measure is an entropy of the value for the set of pixels of the original video signal and/or the processed video signal.

20. The system as claimed in claim 14,
- wherein the set of pixels corresponds to a region of an image of the original video signal and processed video signal, and
- wherein the video signal quality measure determiner is further configured to:
  - determine the quality measure for a plurality of regions of the original video signal and processed video signal, and
  - determine the quality measure by comparing the statistical metrics for the original video signal and the processed video signal for each region.

21. The system as claimed in claim 14, wherein the video signal quality measure determiner is further configured to determine the level of clipping for the set of pixels of the original and the processed video signals by determining a portion of the respective sets of pixels having the luminance value that falls outside the clipping value range.

* * * * *